(12) United States Patent
Lacondemine et al.

(10) Patent No.: US 8,422,001 B2
(45) Date of Patent: Apr. 16, 2013

(54) METHOD OF MEASURING THE VELOCITY OF AN AIRCRAFT BY LASER DOPPLER ANEMOMETRY

(75) Inventors: Xavier Lacondemine, Vilie (FR); Jean-Pierre Schlotterbeck, Rochefort/Samson (FR); Alain Renard, Chabeuil (FR)

(73) Assignee: Thales, Neuilly sur Seine (FR)

( * ) Notice: Subject to any disclaimer, the term of this patent is extended or adjusted under 35 U.S.C. 154(b) by 246 days.

(21) Appl. No.: 12/821,428

(22) Filed: Jun. 23, 2010

(65) Prior Publication Data

US 2011/0043786 A1    Feb. 24, 2011

(30) Foreign Application Priority Data

Jun. 23, 2009    (FR) ...................................... 09 03042

(51) Int. Cl.
*G01P 3/36*    (2006.01)

(52) U.S. Cl.
USPC .......................................... 356/28.5; 356/28

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | | |
|---|---|---|---|---|---|
| 5,703,679 | A | * | 12/1997 | Morbieu | 356/28.5 |
| 2004/0036852 | A1 | * | 2/2004 | Bruel et al. | 356/28.5 |

* cited by examiner

*Primary Examiner* — Luke Ratcliffe
(74) *Attorney, Agent, or Firm* — Stroock & Stroock & Lavan LLP

(57) ABSTRACT

Method of measuring the velocity of an aircraft at a given instant, by laser Doppler anemometry, by performing the steps of acquiring a backscattered signal on at least three oriented line-of-sight axes, and calculating the spectrum of the backscattered signal on each of the line-of-sight axes. Further, acquiring an additional backscattered signal on at least one additional line-of-sight axis (X4) not coincident with one of the three first line-of-sight axes (X1, X2, X3), and calculating the spectrum of the backscattered signal on the additional line-of-sight axis (X4). Several candidate velocity vectors ($\vec{V}c$) and of the projections of the candidate vectors on at least one line-of-sight axis (X1, X2, X3, X4) are calculated. The consistency of the candidate vectors ($\vec{V}c$) is calculated as a function of their projections and as a function of each spectrum of the corresponding backscattered signal on the respective calculation axis (X1, X2, X3, X4). The measured velocity vector ($\vec{V}c$) is chosen from among the candidate velocity vectors ($\vec{V}c$).

14 Claims, 4 Drawing Sheets

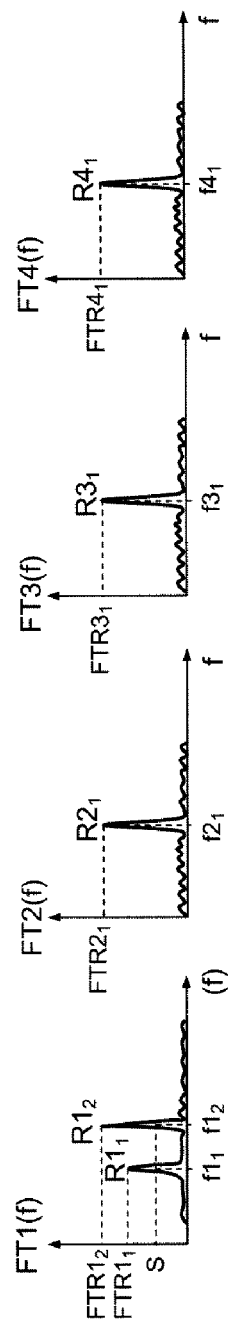

METHOD OF MEASURING THE VELOCITY OF AN AIRCRAFT BY LASER DOPPLER ANEMOMETRY

FIELD OF THE INVENTION

The invention relates to methods of measuring the velocity of an aircraft by laser Doppler anemometry by means of a Lidar (Light Detection and Ranging) in which the emission produced for example by a continuous laser (Light Amplification by Stimulated Emission of Radiation) is used.

BACKGROUND

Methods of measuring the velocity of an aircraft consists in measuring the frequency shift between an emitted reference wave and a wave backscattered by the natural aerosols in the air, which are used as velocity tracers, located on the line-of-sight axis. This shift is representative of the projection, on the line-of-sight axis, of the velocity of the aircraft relative to the air. To take reference measurements, the laser is generally focussed onto a focal zone chosen to be sufficiently far from the aircraft so that the mass of air contained therein is as little disturbed by the aircraft as possible. In this case, the backscattered wave emanates mainly from the tracers within the focal zone.

The useful information carried by the Doppler frequency shift is obtained by using coherent detection. A wave emanating from a coherent light source is split into two. A first wave, called "emitted beam", is sent into the focal zone and a second wave, called "local oscillator", constitutes a reference for coherent detection of the Doppler frequency shift.

The aerosols naturally present in the atmosphere backscatter the light from the emitted beam. The emitted beam is backscattered with a frequency shifted by a Doppler shift $\Delta fi$ relative to the frequency of the emitted beam. The backscattered signal is mixed with the reference wave to form a heterodyne beat signal on the photosensitive surface of a detector.

The Doppler shift $\Delta fi$, on a line-of-sight axis $X_i$, is the difference between the frequency $fi$ of the backscattered signal and the frequency $f$ of the local oscillator. It is used to deduce a measurement of the projection, on the line-of-sight axis $X_i$, of the velocity of the aircraft relative to the ambient medium, i.e. relative to the mass of air lying within the focal zone. The expression that links these two quantities is the following:

$$vi = \Delta fi \cdot \lambda/2 \quad (A)$$

vi being the projection, on the line of sight $X_i$, of the velocity vector of the aircraft relative to the mass of air lying on the line-of-sight axis or in the focal zone and λ being the wavelength of the beam emitted in the medium.

The Doppler shift $\Delta fi$ on a line of sight $X_i$ is conventionally obtained by analysing the backscattered signal. Among the methods that can be used, Fourier transform spectral analysis is generally employed.

The velocity vector of an aircraft is calculated from the components vi of the velocity vector along three non-coplanar line-of-sight axes, the components of the velocity vector vi being obtained using equation (A) from the Doppler shifts $\Delta fi$ of the backscattered signals on the line-of-sight axes in question. This velocity vector is expressed as the TAS (True Air Speed) and the AOA (Angle Of Attack) and SSA (Side Slip Angle).

The frequency of the backscattered signal is determined from the frequency of the line present in the spectrum of the backscattered signal.

However, when an aircraft moves through a mass of air which is speed-inhomogeneous (that is to say when there are several masses of air moving at different speeds), it is not possible to determine the components of the velocity vector on the line-of-sight axes reliably since it is sometimes impossible to determine a unique frequency in the spectra of the backscattered signals on the line-of-sight axes. This is the case when there are distant clouds, when there is turbulence or ground echoes or when there are perturbations of the wake vortex.

The conventional methods of determining the velocity of an aircraft have the drawback either of determining a velocity which may be false (the pilot being unaware that the value supplied to him is not reliable) or of not determining a velocity vector (the velocity of the aircraft is therefore not accessible).

The aforementioned drawbacks are specific to continuous lasers emitting a narrow spectrum. A method based on a pulsed laser does not have these drawbacks, but this method is more expensive and less precise, for velocity measurements, than a method based on a continuous laser since the spectra resulting from the backscattered signals are spectrally more spread out.

SUMMARY OF THE INVENTION

The invention provides a method of determining the velocity of an aircraft relative to a mass of air, which is precise, inexpensive, and reliable, or with a known reliability, and which is readily available, even when the aircraft is in an inhomogeneous mass of air.

For this purpose, an embodiment of the method includes measuring the velocity of an aircraft at a given instant, by laser Doppler anemometry, said method comprising the following steps:

acquisition of a backscattered signal on three first oriented line-of-sight axes; and calculation of the spectrum of the backscattered signal on each of the three first line-of-sight axes, characterized in that the method further includes the following steps:

acquisition of an additional backscattered signal on at least one additional line-of-sight axis not coincident with one of the three first line-of-sight axes;

calculation of the spectrum of the backscattered signal on at least one additional line-of-sight axis;

calculation of several candidate velocity vectors;

calculation of the projections of the candidate vectors on at least one line-of-sight axis, called calculation axis;

calculation of the consistency of the candidate vectors as a function of their projection(s) on the calculation axis (or axes) and as a function of the spectrum (or spectra) of the backscattered signal (or signals) on the calculation axis (or axes); and choosing the measured velocity vector from among the candidate velocity vectors by carrying out a likelihood analysis on the basis of the consistencies of said candidate velocity vectors.

The method may also include:

the step of calculating the consistency of a candidate vector comprises the following steps:

projection of the candidate vector on said calculation axis (or axes);

calculation of the individual consistency between the candidate vector and the backscattered signal on each calculation axis on the basis of the projection of the candidate velocity vector on said calculation axis (or axes) and the spectrum of the backscattered signal on said calculation axis (or axes); and calculation of the product of the individual consistencies, if there are several calculation axes;

the likelihood analysis consists in choosing, from among several candidate vectors:

either the candidate velocity vector which has the highest consistency, when the difference between the highest consistency and the consistencies of the other candidate velocity vectors is greater than a predetermined consistency deviation threshold;

or a combination of several candidate velocity vectors including the candidate velocity vector having the highest consistency and at least one vector having a consistency that differs from the highest consistency by less than a predetermined consistency deviation threshold;

a confidence indicator is ascribed to the measured velocity vector;

before the likelihood analysis, the candidate vector(s) with a consistency below a predetermined consistency threshold is (are) rejected;

before the likelihood analysis, the consistency of the candidate vectors is weighted according to at least one velocity vector measured at a previous instant;

before the likelihood analysis, the consistency of the candidate vectors is weighted according to an estimate of the velocity vector made on the basis of at least one velocity vector measured at an instant preceding the given instant and optionally according to a confidence interval ascribed to the estimate of the velocity vector at the given instant;

before the likelihood analysis, the consistency of the candidate vectors is weighted according to inertial information;

the method includes a step of identifying lines, on the basis of a predetermined line selection criterion, in the spectra of the backscattered signals on the line-of-sight axes;

the candidate vectors are determined by:

selecting three base axes from among the line-of-sight axes, the axis (or axes) not selected being called the redundancy axis (or axes); and constructing candidate velocity vectors from the identified lines on the base axes, the components on the three base axes of said candidate velocity vectors being equal to the components of the identified lines on the three base axes, the calculation axis (or axes) being the redundancy axis (or axes);

the calculation axis (or axes) is (or are) the line-of-sight axis (or axes), and the candidate vectors are constructed by:

constructing sets of lines having a dimension (M) at least equal to 4 and equal to the number of line-of-sight axes on which at least one line has been identified, each line of a set being taken on a different line-of-sight axis from the other lines of said set; and constructing, from each set of lines, a candidate vector that minimizes the deviations with said set;

a candidate vector is constructed from each set by employing a least-squares solution method;

the method includes a step of ascribing, to each projection of the candidate vector on a calculation axis, an expected signal centred on the projection of the candidate vector on said calculation axis and the individual consistency of a candidate vector on a calculation axis is calculated from the spectrum of the backscattered signal on the calculation axis and from the expected signal;

the individual consistency between the candidate vector and the backscattered signal on said calculation axis is equal to the correlation between the expected signal on the redundancy axis and the spectrum of the backscattered signal on the redundancy axis Xi;

the individual consistency between the candidate vector and the backscattered signal on said calculation axis is calculated by a least-squares method;

the calculation axes are the line-of-sight axes and the candidate vectors are obtained by:

determining an uncertainty volume from at least one aircraft velocity vector calculated beforehand and, dividing the uncertainty volume into candidate vectors;

the uncertainty volume is calculated by means of a Kalman filter;

the uncertainty volume depends on information about the dynamics of the aircraft;

the individual consistency between a candidate vector and the backscattered signal on a line-of-sight axis is calculated from an expected power threshold Ps and from the spectral power density Rij of the spectrum of the backscattered signal on the axis of index i at the frequency of the projection of the candidate vector of index j on the axis of index i using the following formula:

$$CONij = \prod_I^N \exp\left(-\frac{Rij}{Ps}\right); \text{ and}$$

at least one velocity vector calculated previously is calculated by implementing the method according to any one of claims 1 to 14.

The method according to an embodiment of the invention serves to improve the reliability of the measurement of the velocity of an aircraft when it is in a speed-inhomogeneous environment. More particularly, this method serves to improve the reliability of the measurement of the velocity of an aircraft in a cloudy environment or when at least one line-of-sight axis is directed towards the ground.

This method also makes it possible to increase the availability of the velocity measurement in a speed-inhomogeneous environment. It does not degrade the precision of the velocity measurement when the environment is homogeneous.

The method also allows the user system (the pilot or automatic flight system) receiving the information about the velocity of the aircraft to choose to use the velocity information or not, depending on the level of reliability of the information transmitted thereto.

The method according to the second embodiment of the invention helps to improve the reliability of the measurement of the velocity of an aircraft in an environment disturbed by vortex perturbations.

BRIEF DESCRIPTION OF THE DRAWINGS

Other features and advantages of the invention will become apparent on reading the following detailed description given by way of non-limiting example, and with reference to the appended drawings in which:

FIGS. 2a, 2b, 2c and 2d show examples of spectra of backscattered signals as a function of their frequencies on a first, a second, a third and a fourth line-of-sight axis respectively;

FIG. 3a is a schematic representation of the gain in focussing the laser beam as a function of the distance from the aircraft, while

In going from one figure to another, identical elements are identified by the same references.

DETAILED DESCRIPTION

Figure 1:
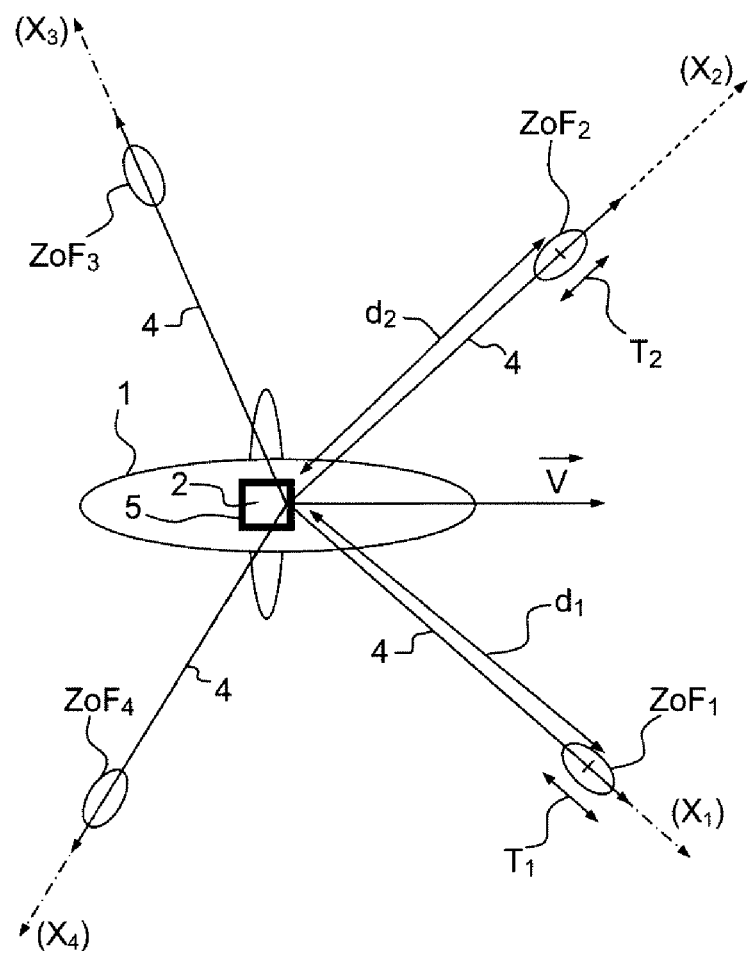
FIG. 1 is a schematic representation of an aircraft moving through a mass of air.

FIG. 1 illustrates an aircraft 1 equipped with a laser 2 continuously emitting beams, called emitted beams 4, with a wavelength $\lambda$. The aircraft is moving with a velocity $\vec{V}$ relative to a mass of air. The method of measuring the velocity $\vec{V}$ is based on the laser Doppler anemometry technique.

For this purpose, the emitted beams 4 are focussed on each of the axes $X_i$ in a focal zone $ZOF_i$. A focal zone is chosen so that the movement of the mass of air in this zone is independent of that of the aircraft or follows a predefined model. The focal zone $ZOF_i$ on a line-of-sight axis is a zone located at an average distance from the aircraft, called the focal distance $d_i$, and the thickness of which, on the line-of-sight axis, is called the focal zone thickness $T_i$. FIG. 1 shows the focal zones $ZOF_1$, $ZOF_2$, $ZOF_3$ and $ZOF_4$. For the sake of clarity, FIG. 1 shows only the thicknesses $T_1$ and $T_2$ of the axes $X_1$, and $X_2$ together with the associated focal distances $d_1$ and $d_2$.

The focal distance is chosen according to the size and dynamics of the aircraft. As a variant, the laser beams are not focussed. The method generally uses the same optics for emission and reception, but it is quite conceivable to use different optics for emission and reception. The beams are emitted by a single laser, but it is conceivable to send a number of beams each coming from a different laser.

Beams 4 are sent along three first line-of-sight axes $X_1$, $X_2$ and $X_3$ and along at least one additional axis $X_4$. In the embodiment shown in FIGS. 1 and 5, only four line-of-sight axes are used. For the sake of simplicity, the four line-of-sight axes are shown in a two-dimensional space, although these axes are not coplanar. Each line-of-sight axis $X_i$ is oriented.

The line-of-sight axes are not mutually coincident and i is the index of a line-of-sight axis $X_i$, where i=1, . . . , N, N being the number of line-of-sight axes $X_i$ used in the method.

The aerosols present in the air on a line-of-sight axis backscatter the emitted beam and produce a backscattered signal on this line-of-sight axis. The backscattered signals are picked up by means of a detector 5 in a backscattered signal acquisition step.

FIGS. 2a, 2b, 2c and 2d show an example of spectra of backscattered signals on the first line-of-sight axis $X_1$ (FIG. 2a), on the second line-of-sight axis $X_2$ (FIG. 2b), on the third line-of-sight axis $X_3$ (FIG. 2c) and on the fourth line-of-sight axis $X_4$ (FIG. 2d).

The spectrum $FTi(f)$ of the backscattered signal on the line-of-sight axis $X_i$ is expressed as a function of the frequency f of this signal. The method involves for example the Fourier transform of the signal.

When the backscattered signal comes from aerosols all moving at the same speed, the backscattered signal has a single frequency. The spectrum of this signal shows a single line of high amplitude, as may be seen in FIGS. 2b, 2c and 2d. However, as shown in FIG. 2a, when several types of aerosol having different speeds are present on the line-of-sight axis, the energy of the backscattered signal is distributed over several frequencies.

Figure 4A:
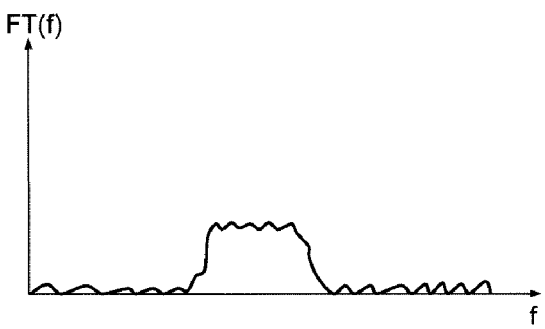
FIG. 4a is a schematic representation of a spectrum of a backscattered signal as a function of its frequency, on a line-of-sight axis where there is a perturbation of the turbulence type.
Figure 4B:
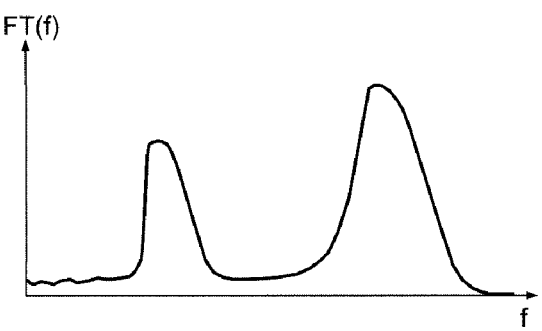
FIG. 4b is a schematic representation of a spectrum of a backscattered signal in the presence of a cloudy layer carried by a stronger wind.

With the methods of the prior art using the information coming only from three line-of-sight axes, the component of the velocity vector on the line-of-sight axis in question can take several possible values, but it is not known how to identify which is the useful component. This is for example the case when the mass of air present in the focal zone forms a vortex in which the speeds of the aerosols are distributed over a range of speeds. FIG. 4a shows schematically an example of a spectrum of a signal backscattered by a vortex perturbation. Most of the power of the signal is spread over a finite frequency range and it is not possible for the frequency of the signal to be precisely identified. A component of the velocity vector on the line-of-sight axis cannot be reliably and precisely deduced therefrom. FIG. 4b shows schematically a spectrum of a signal backscattered in the presence of a cloudy layer located at some distance from the aircraft and carried by stronger wind than the mass of air located in the focal zone. The intensity of the signal is distributed over two Gaussians of the same height. It is not possible to recognize the signal backscattered by the cloudy layer from the useful signal based on spectral-shape criteria. The same problem arises when the line-of-sight axis is directed towards the ground and when a ground echo is added to the useful signal.

For a spectrum having two lines of large amplitude, as shown in FIG. 2a, one solution would be to discriminate the useful line (coming from the mass of air in the focal zone) from the parasitic line (coming from a cloud or the ground) on the basis of the value of the spectrum or on the basis of the frequency thereof, although these methods are not reliable. This is because it is not known how to determine which of the cloud and the mass of air is the one moving faster.

Moreover, the focussing gain GF(x) of the incident beam does not have sufficient spatial selectivity for the signal backscattered by carriers located outside the focal zone to be attenuated sufficiently not to be picked up by the detector.

Figure 3A:
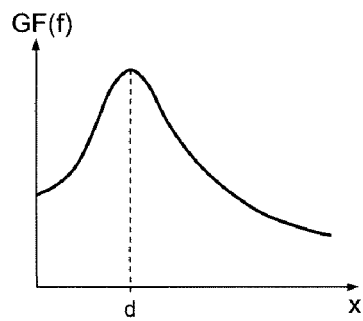

FIG. 3a shows the focussing gain GF (x) on a focal axis as a function of the distance x from the aircraft. The focussing gain GF (x), as may be seen in FIG. 3a, is a Gaussian with a maximum at the focal distance.

The amplitude IT of the signal backscattered by a mass of air located at a distance x from the aircraft is given by:

$$IT(x) = GF(x) * \beta(x)$$

where $\beta(x)$ is the backscattering factor of the mass of air at the distance x. The backscattering factor $\beta(x)$ of a mass of air depends on the characteristics of the tracers and on the number of them in the mass of air.

Figure 3B:
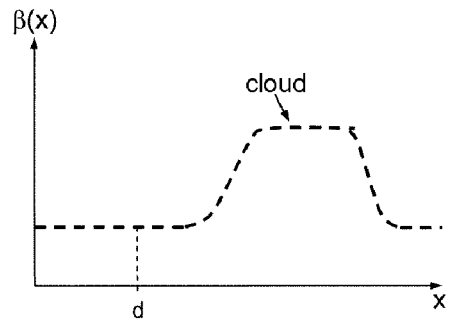
FIG. 3b is a schematic representation of an example of a backscattering factor for a mass of air as a function of its distance from an aircraft.

FIG. 3b shows schematically an example of the variation in the backscattering factor of the mass of air surrounding an aircraft. The mass of air has a low backscattering factor in the region of around the focal distance d and a plateau with a high backscattering factor at a large distance from the aircraft. This profile is characteristic of the presence of a cloud on the line-of-sight axis in question at a large distance from an aircraft. Even if a cloud, or the ground, both these having high backscattering factors, were to be outside the focal zone, at a distance where the focussing gain is low, the contribution (in intensity) to the backscattered signal is not negligible. There is therefore no one-to-one relationship between the intensity of the backscattered signal and the distance to the contributing tracers. The method cannot be based on the power of the spectrum in order to differentiate two lines of a spectrum of the type shown in FIG. 2a.

Thus, in the method according to an embodiment of the invention, it is proposed to use the redundancy provided by the acquisition of a backscattered signal on at least one additional line-of-sight axis, i.e. on at least a fourth line-of-sight axis, in order to calculate the velocity vector of the aircraft. In the rest of the description, the case employing a single additional line-of-sight axis will be addressed first, followed by the generalization to the case employing several additional line-of-sight axes.

After signal acquisition on the four line-of-sight axes, the spectrum of each backscattered signal on each of these axes is calculated. The candidate velocity vectors $\vec{V}c$ and their respective consistencies, which are a function of the projections of the candidate vectors on at least one line-of-sight axis, called the calculation axis $X_1$, $X_2$, $X_3$, $X_4$ and a function of the spectra $FT1(V)$, $FT2(V)$, $FT3(V)$, $FT4(V)$ of the backscattered signals on the respective calculation axis (or axes) $X_1$, $X_2$, $X_3$, $X_4$, are calculated. The velocity vector $\vec{V}$ of the aircraft is chosen from among the candidate velocity vectors $\vec{V}c$ by carrying out a likelihood analysis of their consistencies CON.

It should be noted that the velocity power spectra $FT1(V)$, $FT2(V)$, $FT3(V)$, $FT4(V)$ of the backscattered signals on the respective line-of-sight axes $X_1$, $X_2$, $X_3$, $X_4$ are directly proportional to the spectra $FT1(f)$, $FT2(f)$, $FT3(f)$, $FT4(f)$ plotted as a function of frequency in FIGS. 2a to 2d.

In first and second embodiments according to the invention, the candidate velocity vectors are constructed from lines identified in the spectra of the backscattered signals on line-of-sight axes. More precisely, the candidate velocity vectors are constructed from lines identified in the spectra of backscattered signals on at least three line-of-sight axes.

In a first embodiment according to the invention, the velocity vector $\vec{V}$ is chosen by implementing the method described below. One or more lines on each of the line-of-sight axes $X_1$, $X_2$, $X_3$, $X_4$, are selected. A line is identified when it satisfies a predetermined line selection criterion. A line selection criterion may consist in identifying a line when the amplitude of the spectrum of the signal exceeds a predetermined threshold S. The spectrum is filtered by an operator matched to the expected signal, for example by a Gaussian having the characteristics corresponding to the expected turbulence of the mass of air.

A first line is identified at the frequency at which the amplitude of the filtered spectrum is a maximum and above the threshold S. The next line is determined by the same method after having removed, from the spectrum, a frequency range lying around the frequency of the first identified line. The line detection procedure stops when there are no more maxima exceeding the threshold S. Other line detection principles are possible so as to be best adapted to the characteristics of the equipment. For example, a line is identified when a minimum percentage of the energy of the spectrum is confined to a restricted frequency range.

In the examples of spectra shown in FIGS. 2a to 2d, two lines $R1_1$ and $R1_2$ are identified on the first axis $X_1$ the respective amplitudes of the spectrum of which, namely $FTR1_1$ and $FTR1_2$ (or power transported at these frequencies), are above the predetermined threshold S. These lines are centred on line frequencies $f1_1$ and $f1_2$ which correspond to velocity components $V1_1$ and $V1_2$ respectively on the first axis (see FIG. 5). A standard deviation $E1_1$ and $E1_2$ is associated with the identified lines. A single line $R2_1$, $R3_1$ and $R4_1$ has been identified on each of the second, third and fourth line-of-sight axes $X_2$, $X_3$ and $X_4$, said lines being centred on respective line frequencies $f2_1$, $f3_1$ and $f4_1$ that correspond to velocity components $V2_1$, $V3_1$ and $V4_1$ respectively. The amplitudes of the spectra for these lines are $FTR2_1$, $FTR3_1$ and $FTR4_1$ respectively. Associated with the identified lines are respective standard deviations $E2_1$, $E3_1$ and $E4_1$ that depend on the shape of the corresponding lines.

Three axes, called base axes, are selected. The base axes are selected on the basis of a predetermined selection criterion. The line-of-sight axes not selected are called redundancy axes.

Candidate velocity vectors are constructed on the basis of the base axes, the components of said vectors along the three base axes being the velocity components associated with the identified lines on these base axes. In other words, constructed from the identified lines on the base axes are the possible three-dimensional vectors that have, on each base axis, a velocity component equal to the velocity component associated with an identified line on the base axis in question. A line on each of the three base axes results in a single candidate vector. If an axis possesses two lines, and two axes possess one line, two candidate vectors are obtained. If two axes possess two lines and one axis possesses one line, four candidate vectors are obtained, and so on.

Preferably, the criterion for selecting the three base axes consists in choosing the line-of-sight axes having the spectrum with the fewest lines so as to produce a minimum number of candidate velocity vectors, thereby limiting the cost of the method in terms of calculations.

Figure 5:
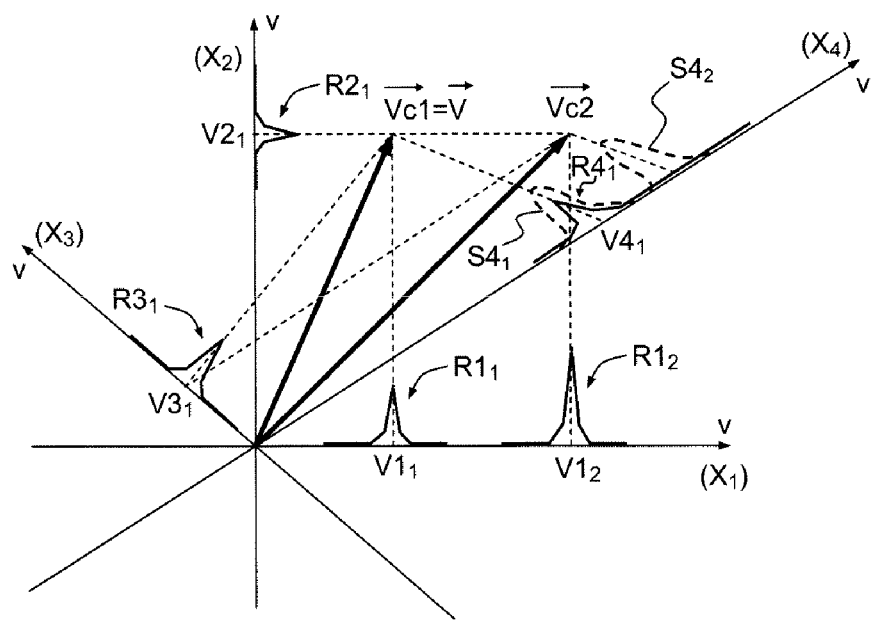
FIG. 5 is a schematic representation of two candidate velocity vectors obtained from three measurement axes and their projections on an additional line-of-sight axis, FIG. 5 also showing the spectra of the backscattered signals represented in FIGS. 2a to 2d, as a function of the velocity, on the line-of-sight axes.

As shown in FIG. 5, taking the examples of the spectra shown in FIGS. 2a, 2b and 2c, based on the identified lines $R1_1$ and $R1_2$ on the first line-of-sight axis $X_1$, the line $R2_1$ on the axis $X_2$ and the line $R3_1$ on the axis $X_3$, two candidate velocity vectors $\vec{V}c1$ and $\vec{V}c2$ are constructed. The axes $X_1$ and $X_2$ lie in the plane of the sheet, unlike the axes $X_3$ and $X_4$. The projections of the candidate vectors on the axes $X_3$ and $X_4$ are orthogonal, but the dotted lines representing these projections in FIG. 5 do not make right angles with these axes as they do not lie in the plane of the sheet.

Next, the candidate vectors are projected on the calculation axes. In the embodiment shown in FIG. 5, the calculation axis is the redundancy axis $X_4$, and the two candidate vectors $\vec{V}c1$ and $\vec{V}c2$ are projected on the axis $X_4$. This figure also shows expected signals $S4_1(V)$ and $S4_2(V)$ on the redundancy axis $X_4$ of the two candidate velocity vectors $\vec{V}c1$ and $\vec{V}c2$ An expected signal $Si_j(V)$ on the redundancy axis is associated with each projection of the candidate vector of index j on a redundancy axis of index i. The expected signal on the redundancy axis $X_i$ is centred on the projection of the candidate vector on said axis. In other words, the power of the expected signal is maximized at the projection of the candidate vector on the redundancy axis in question. A shape and a power, dependent on the shape and the power of the lines from which the candidate velocity vector is constructed, are associated with this expected signal. For example, as shown in FIG. 5, the expected signal shown by the dotted lines is a Gaussian centred around the projection of the candidate vector on said additional axis. The standard deviation Ec of the expected signal is estimated according to the standard deviations of the identified candidate lines on the measurement axes.

The consistency CON of the candidate vectors is then calculated. The individual consistency between a candidate vector and the backscattered signal on a calculation axis of index i is called CONi, namely the quantity characterizing the consistency between the expected signal, coming from the projection of the candidate vector on the calculation axis in question, and the spectrum of the backscattered signal on the calculation axis in question. Several non-limiting examples of the consistency calculation will be given below.

The individual consistency between the candidate velocity vector of index j and a calculation axis $X_i$ is for example equal to the correlation CORij between the expected signal on the calculation axis and the spectrum of the backscattered signal on the redundancy axis $X_i$. The correlation CORij is therefore calculated in the following manner:

$$CORij = \int_0^\infty Si_j(V) * FTi(V) dV.$$

As above, and in the rest of the text, the consistency calculations are carried out as a function of the velocity, but they could be written equivalently as a function of the frequency f of a backscattered signal on said axis, said frequency being linked to the velocity and to the frequency of the local oscillator through equation A.

In the first embodiment, when the calculation axes are the redundancy axes, the individual consistencies are calculated on the redundancy axes.

In the example shown in FIG. 5, in which there is one redundancy axis $X_4$, the correlation COR41 is strong since the expected signal associated with $\vec{V}c1$ is superposed on a line of high intensity in the spectrum of the backscattered signal on the axis $X_4$. Conversely, the correlation COR42 is very weak since the expected signal associated with $\vec{V}c2$ is superposed with a zone of the spectrum of the backscattered signal on the axis $X_4$ of very low intensity.

As a variant, the individual consistency between a candidate vector and a calculation axis is calculated by a least-squares method from the projection of the candidate vector of index j on the calculation axis of index i and the spectrum of the backscattered signal on this axis.

In a first example, the sum SCji of the squares of the deviations, called the sum of the residues, between the expected signal of the candidate vector of index j and the spectrum of the backscattered signal on the calculation axis of index i, is calculated:

$$SC4j = \int_0^\infty (S4_j(V) - FT4(V))^2 dV.$$

The individual consistency is then:

$$CONij = e^{-\frac{SCij}{SC0}}$$

where SC0 represents the expected residue or its estimate by involving a predetermined value depending on the application. For example, it is determined by a compromise between the performance represented by the probability of velocity detection and the probability of a false alarm. The lower the chosen probability of a false alarm, the lower the probability of velocity detection.

In a second example, less expensive than the first in terms of calculation, the sum of the residues is calculated from the frequency (or velocity) of the candidate vector projection of index j on the axis of index i and from the average frequency (or average velocity) of the spectrum of the backscattered signal on the calculation axis of index i. The sum of the residues is equal to the square of the difference between the frequency (or velocity) of the candidate vector projection of index j on the axis of index i and the average frequency (or velocity) of the backscattered signal on the axis of index i.

The individual consistency is then:

$$CONij = e^{-\frac{(fi-fpj)^2}{Fs0}}$$

where fi is the average frequency of the spectrum of the backscattered signal on the axis of index i, fpj is the frequency of the projection of the candidate vector of index j on the axis of index i and Fs0 is the expected residue expressed in hertz (or in m·s$^{-1}$ if the calculation is made in terms of velocity.)

In the case in which there is a single redundancy axis, the individual consistency is equal to the consistency or overall consistency CONj of the candidate vector of index j.

A likelihood analysis is carried out using the consistencies CON of each candidate velocity vector so as to determine the velocity vector of the aircraft, called the measured velocity vector. The measured velocity vector is the vector that has the maximum likelihood. Before the likelihood analysis, the candidate vectors that have a consistency below a predetermined consistency threshold are rejected. If all the candidate vectors are rejected, the measurement is declared invalid or a downgraded measurement is supplied with a suitable default indicator.

If this is not the case, a conventional likelihood analysis is carried out on the non-rejected candidate vectors, a non-limiting example of an analysis being given below. When a candidate vector $\vec{V}c$ has a higher consistency CON than the other candidate vectors and the difference between the consistency CON of this candidate velocity vector and the closest consistency CON is above a predetermined threshold, the candidate vector having the highest consistency CON is the velocity vector having the maximum likelihood.

When the difference between the highest consistency CON and the closest CON is below a predetermined consistency deviation threshold, the measured velocity vector results from the average of the following candidate vectors: the candidate velocity vector that has the highest consistency and the candidate velocity vectors that have a consistency differing from the highest consistency by an amount smaller than the consistency deviation threshold. The average is weighted as a function of the consistency CON of each of said selected candidate velocity vectors.

As a variant, no candidate vectors are rejected and the likelihood analysis is carried out on all the candidate vectors.

In the embodiment shown in FIG. 5, the measured velocity vector is the first candidate velocity vector $\vec{V}c1$.

Advantageously, the consistency of the candidate vectors is weighted according to additional criteria taken separately or together before the likelihood analysis is carried out.

For example, the procedure takes account of the velocity vectors measured at one or more prior instants by weighting, before the likelihood analysis, the consistency CON of the candidate velocity vectors as a function of one or more previously measured vectors. For this purpose, the consistency of a candidate vector is for example weighted as a function of the difference between said candidate vector and the previously measured vector (or vectors). A candidate vector close to the velocity vectors measured at the previous instant is favoured over a remote candidate vector by multiplying its consistency by a higher weighting factor. In another example, the consistency of a candidate vector is weighted by means of a weighting factor F that depends on an estimate of the velocity vector $\vec{V}e$ at the given instant obtained from one or more previously measured velocity vectors and optionally from a confidence interval I ascribed to the estimate. For example, the velocity vector at the given instant is estimated by means of a Kalman filter. The weighting factor is for example equal to $$F = e^{\frac{(Vc - Ve)^2}{I}}.$$

In the case of delayed processing, the consistency of the candidate vectors may also be weighted as a function of the velocity vectors measured later. A procedure may also be based on velocity vectors calculated from other types of information (for example inertial information or information coming from satellites) in order to weight the consistencies.

A quality indicator is associated with the measured velocity vector $\vec{V}$. This quality indicator corresponds to the probability that the precision and/or the integrity of the velocity measurement are/is within a predetermined performance range. The quality indicator is for example based on the consistency of the candidate vector selected. The higher the consistency of the candidate vector, the better the quality indicator.

In the first embodiment, when there is more than one redundancy axis, the calculation axes are the redundancy axes. The candidate vectors are projected on all the redundancy axes and the individual consistency CONji of the candidate velocity vectors on each of the redundancy axes j is calculated. The consistency CONj of a candidate vector, called the overall consistency, is the product of the individual consistencies.

In a second embodiment of the invention, as in the first embodiment, lines on each of the line-of-sight axes $X_1$, $X_2$, $X_3$ and $X_4$ are selected. Next, all possible sets of lines with M dimensions are constructed. M is at least equal to 4 and equal to the number of axes having at least one line. Each line of a set is taken on a line-of-sight axis different from the other lines of the set. The aim is to form sets of N lines (corresponding to one line on each axis), but if one axis has no lines, the aim is to form all combinations of N−1 lines. This embodiment cannot be carried out if fewer than four axes have at least one identified line. In such a case, the velocity measurement is unavailable.

If there are four line-of-sight axes, three of which have one line and one comprises two lines, two sets of lines in four dimensions are formed. A three-dimensional candidate vector is constructed from each set of lines using a conventional least-squares solution method. The procedure thus passes from an M-dimensional space to a three-dimensional vector that minimizes the differences between the set M and the three-dimensional vector. For example, a conventional least-squares solution method is used.

In other words, the second embodiment amounts to selecting base axes that are line-of-sight axes on which at least one line has been identified and to constructing candidate vectors from the identified lines on these base axes.

In this embodiment, the calculation axes are the line-of-sight axes. The candidate vectors are projected on all the line-of-sight axes and an expected signal is optionally ascribed to each projection. Next, the consistencies CON of the candidate vectors are calculated, these being the products, effected on all the line-of-sight axes, of the individual consistencies of the vectors on each line-of-sight axis. The individual consistencies are calculated in the same way as in the first embodiment. The measured velocity vector is then obtained by carrying out a likelihood analysis optionally preceded by a weighting of the consistencies similar to the analysis carried out in the first embodiment.

In the first two embodiments, the candidate vectors are constructed from the lines identified on the base axes. These embodiments therefore make it possible, using only four measurement axes, not only to detect but also to identify an inconsistent candidate vector. This is possible because the method does not select a single line from among several lines in the spectra of the base axes in order to construct the candidate vector. Each of the identified lines is used to construct the candidate vectors. This amounts to making use of the uncertainty due to the fact that there may be several lines on an axis in order to resolve the ambiguity introduced by these lines. Thus, it is possible to have additional information partially linked, but sufficient, with the proposed algorithms in order to achieve the spatial selectivity objective.

Thus, the velocity calculation has a good availability and good precision in an environment that is inhomogeneous in terms of speed.

In a third embodiment according to the invention, the method is based on the fact that the velocity vector $\vec{V}$ of the aircraft does not vary suddenly. The candidate velocity vectors $\vec{V}c$ at a given instant t lie within an uncertainty volume, the boundary of which is defined according to the calculated velocity vector at the previous instant t−Δt. For example, the uncertainty volume is estimated from at least one previous velocity measurement by propagation, for example using a Kalman filter.

As a variant, the uncertainty volume is also estimated from information about the dynamics of the carrier (for example from inertial information delivering low-noise measurements). Thus, a better estimate of the uncertainty volume is obtained.

The uncertainty volume is divided into candidate velocity vectors, for example by means of one of the following two conventional methods:
  random sampling in the uncertainty volume ("particulate" method). This method leads to a very large number of candidate vectors;
  regular spacing ("grid" method). The spacing of the candidate vectors depends on the air turbulence. For example, the minimum expected turbulence is chosen so that the range of uncertainty is fully covered. This method results in a smaller number of candidate vectors than the previous method.

In this embodiment, the calculation axes are the line-of-sight axes. The candidate vectors are projected on all the line-of-sight axes. The consistency CON of each candidate vector is calculated, the consistency of a candidate vector being equal to the product effected on the N line-of-sight axes of the individual consistencies.

The individual consistency CONij between a candidate vector of index j and the spectrum of the backscattered signal on a line-of-sight axis of index i is calculated from the spectrum of the backscattered signal on the axis i and from the projection of the candidate vector j on this axis i, and is given by the following formula:

$$CONij = \prod_1^N \exp\left(-\frac{Rij}{Ps}\right)$$

where Ps is the expected power threshold and Rij is the spectral power density of the backscattered signal on the axis of index i at the frequency (or velocity) of the projection of the vector of index j on the axis of index i.

The correct candidate vector is accurately determined using this method since lines in the spectra are not selected for the purpose of identifying the most consistent candidate vector. Rather, the spectrum of the backscattered signal as such is used. The velocity calculation thus provides good availability and high precision in a speed-inhomogeneous environment.

A likelihood analysis is then carried out, possibly with a prior weighting of the consistencies, similar to that carried out in the first embodiment for determining the measured velocity vector.

The third embodiment may be initialized by one of the first two embodiments. In this case, the velocity measurements made at the previous instants are calculated from one of the methods according to the first or second embodiment. These measurements initialize the propagation filter for estimating the uncertainty volume at a given instant.

The third embodiment, since it does not use a threshold on the spectra of the signals on the various axes, operates with signals of lower intensity, but at the price of a higher calculating power, than the first two embodiments. The calculating power is higher the poorer the preceding estimate.

While there have been shown and described particular features of the invention as applied to preferred embodiments thereof, it will be understood that various omissions, substitutions, and changes in the form and details of the devices illustrated, and in their operation, may be made by those skilled in the art without departing from the spirit and scope of the invention.

The invention claimed is:

1. A method of measuring velocity of an aircraft at a given instant, by laser Doppler anemometry, said method comprising the following steps:
   acquisition of backscattered signals on three first line-of-sight axes;
   calculation of a spectrum of the backscattered signals;
   acquisition of at least an additional backscattered signal on at least one additional line-of-sight axis not coincident with one of the three first line-of-sight axes;
   calculation of a spectrum of each additional backscattered signal;
   calculation of a plurality of candidate velocity vectors;
   calculation of projections of the candidate velocity vectors on at least one first line-of-sight axis to provide at least a calculation axis;
   calculation of consistencies of the candidate velocity vectors as functions of the projections and of a spectrum of a backscattered signal acquired on the calculation axis; and
   choosing a measured velocity vector from among the candidate velocity vectors by carrying out a likelihood analysis on the basis of the consistencies of the candidate velocity vectors.

2. The method of measuring the velocity of an aircraft according to claim 1 wherein the step of calculating the consistencies of the candidate velocity vectors comprises the following steps:
   projection of each candidate velocity vector on the calculation axis;
   calculation of an individual consistency between each candidate vector and the backscattered signal on the calculation axis on the basis of the projection of the candidate velocity vector on the calculation axis and the spectrum of the backscattered signal on the calculation axis; and
   calculation of a product of the individual consistencies, if there are a plurality of calculation axes.

3. The method of measuring the velocity of an aircraft according to claim 1 wherein a confidence indicator is associated with the measured velocity vector.

4. The method of measuring the velocity of an aircraft according to claim 1 wherein the candidate velocity vectors are calculated, on the basis of a predetermined selection criterion, from identified lines in the spectra of the backscattered signals on the line-of-sight axes.

5. The method of measuring the velocity of an aircraft according to claim 4, wherein the candidate velocity vectors are determined by:
   selecting three base axes from among the line-of-sight axes, each line-of-sight axis not selected being a redundancy axis; and
   constructing the candidate velocity vectors from the identified lines on the base axes, the components on the three base axes of the candidate velocity vectors being equal to components of the identified lines on the three base axes, and wherein each redundancy axis is a calculation axis.

6. The method of measuring the velocity of an aircraft according to claim 4, wherein each calculation axis is a line-of-sight axis and the candidate velocity vectors are constructed by:
   constructing sets of lines having a dimension at least equal to 4 and equal to the number of line-of-sight axes on which at least one line has been identified, each line of a set being taken on a different line-of-sight axis from the other lines of the set; and
   constructing, from each set of lines, the candidate velocity vector that minimizes deviations with the set.

7. The method of measuring the velocity of an aircraft according to claim 6, wherein each candidate velocity vector is constructed from a set of lines by employing a least-squares solution method.

8. The method of measuring the velocity of an aircraft according to claim 4, further comprising a step of associating with each projection of each candidate velocity vector on a calculation axis an expected signal centered on the projection of the candidate velocity vector on said-the calculation axis, and the individual consistency of the candidate velocity vector on the calculation axis is calculated from the spectrum of the backscattered signal on the calculation axis and from the expected signal.

9. The method of measuring the velocity of an aircraft according to claim 8, wherein the individual consistency between each candidate vector and the backscattered signal on the calculation axis is equal to a correlation between the expected signal on the calculation axis and the spectrum of the backscattered signal on a redundancy axis.

10. The method of measuring the velocity of an aircraft according to claim 4, wherein the individual consistency between each candidate vector and the backscattered signal on the calculation axis is calculated by a least-squares method.

11. The method of measuring the velocity of an aircraft according to claim 1, wherein the calculation axes are the line-of-sight axes, the candidate velocity vectors are obtained by determining an uncertainty volume from at least one aircraft velocity vector calculated beforehand at a given instant, by dividing the uncertainty volume into candidate vectors, and the individual consistency between each candidate velocity vector and the backscattered signal on each line-of-sight axis is calculated from an expected power threshold Ps and from a spectral power density Rij of a spectrum of a backscattered signal on an axis of index i at a frequency of a projection of a candidate velocity vector of index j on the axis of index i in accordance with the following formula:

$$CONij = \prod_{I}^{N} \exp\left(-\frac{Rij}{Ps}\right).$$

12. The method of measuring the velocity of an aircraft according to claim 11, wherein the uncertainty volume is calculated using a Kalman filter.

13. A method of measuring the velocity of an aircraft according to claim 11, wherein the uncertainty volume depends on information about dynamics of the aircraft.

14. The method of measuring the velocity of an aircraft according to claim 11 wherein each velocity vector calculated beforehand is calculated by employing the following method:
 acquisition of second backscattered signals on three second line-of-sight axes;
 calculation of a spectrum of the second backscattered signals;
 acquisition of at least a second additional backscattered signal on at least one additional line-of-sight axis;
 calculation of a spectrum of each second additional backscattered;
 calculation of a plurality of second candidate velocity vectors;
 calculation of projections of the second candidate velocity vectors on at least one line-of-sight axis to provide a second calculation axis;
 calculation of consistencies of the second candidate velocity vectors as functions of the projection and of a spectrum of a second backscattered signal acquired on the second calculation axis; and
 choosing a second measured velocity vector from among the second candidate velocity vectors by carrying out a likelihood analysis on the basis of consistencies of the second candidate velocity vectors.

* * * * *